US010552616B2

(12) United States Patent
Bodin et al.

(10) Patent No.: US 10,552,616 B2
(45) Date of Patent: Feb. 4, 2020

(54) DETERMINING AND MANAGING APPLICATION VULNERABILITIES

(71) Applicant: International Business Machines Corporation, Armonk, NY (US)

(72) Inventors: William K. Bodin, Austin, TX (US); Indiver N. Dwivedi, Pune (IN); David Jaramillo, Lake Worth, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 103 days.

(21) Appl. No.: 15/440,643

(22) Filed: Feb. 23, 2017

(65) Prior Publication Data

US 2018/0239903 A1     Aug. 23, 2018

(51) Int. Cl.
*G06F 21/00*     (2013.01)
*G06F 21/57*     (2013.01)

(52) U.S. Cl.
CPC ................... *G06F 21/577* (2013.01)

(58) Field of Classification Search
CPC ............. G06F 21/577; G06F 17/30091; G06F 21/565; G06F 2221/033; G06F 21/56; H04L 63/1433
See application file for complete search history.

(56) References Cited

U.S. PATENT DOCUMENTS

| | | | |
|---|---|---|---|
| 7,779,472 B1 * | 8/2010 | Lou | G06F 21/566 726/22 |
| 8,458,798 B2 | 6/2013 | Williams et al. | |
| 8,806,570 B2 | 8/2014 | Barton et al. | |
| 9,032,520 B2 | 5/2015 | Banzhof | |
| 2013/0074182 A1 * | 3/2013 | Ikeda | G06F 21/00 726/22 |
| 2013/0227683 A1 * | 8/2013 | Bettini | G06F 21/57 726/22 |
| 2013/0298245 A1 * | 11/2013 | Das | G06F 21/577 726/25 |
| 2014/0137190 A1 | 5/2014 | Carey et al. | |
| 2015/0143502 A1 | 5/2015 | Peterson | |
| 2017/0220805 A1 | 8/2017 | Ng et al. | |

* cited by examiner

*Primary Examiner* — Yogesh Paliwal
(74) *Attorney, Agent, or Firm* — Cantor Colburn LLP; David Zwick

(57) ABSTRACT

A method includes retrieving application files of an enterprise application store. Each application file corresponds to an application provided by the enterprise application store. The method also includes scanning each retrieved application file. The scanning includes identifying vulnerable application program interfaces that are used by each retrieved application file. The method also includes assigning a vulnerability index to each application, based on the scanning of each application's corresponding application file.

17 Claims, 9 Drawing Sheets

400

| FUNCTION ID | FUNCTION NAME | API CATEGORY | PLATFORM ID | THREAT CATEGORY | PUBLICLY LISTED VULNERABILITY | ENTERPRISE LISTED VULNERABILITY | ENTERPRISE EXCEPTION OVERRIDE |
|---|---|---|---|---|---|---|---|
| 1024 | FUNCTION 1024 | TouchID | iOS8 | NONE | YES | NO | NO |
| 2048 | FUNCTION 2048 | GEOLOCATION | iOS5 | PRIVACY | YES | NO | YES |
| 4095 | FUNCTION 4095 | PAYMENTS | ANDROID4 | VULNERABLE | YES | NO | NO |
| 8192 | FUNCTION 8192 | CONTACTS | iOS6 | DEPRECATED | NO | YES | YES |

| STATIC THREAT CATEGORIES ||
| THREAT CATEGORY | THREAT WEIGHT |
| --- | --- |
| KNOWN DEPRECATED API | 1 |
| KNOWN VULNERABLE API | 2 |
| SOCIAL API (FACEBOOK/TWITTER/ETC.) | 3 |
| PRIVACY RELATED API : GEO LOCATION / USER BEING TRACKED/ MICROPHONE / CAMERA / | 4 |

400

| FUNCTION ID | FUNCTION NAME | API CATEGORY | PLATFORM ID | THREAT CATEGORY | PUBLICLY LISTED VULNERABILITY | ENTERPRISE LISTED VULNERABILITY | ENTERPRISE EXCEPTION OVERRIDE |
|---|---|---|---|---|---|---|---|
| 1024 | FUNCTION 1024 | TouchID | iOS8 | NONE | YES | NO | NO |
| 2048 | FUNCTION 2048 | GEOLOCATION | iOS5 | PRIVACY | YES | NO | YES |
| 4095 | FUNCTION 4095 | PAYMENTS | ANDROID4 | VULNERABLE | YES | NO | NO |
| 8192 | FUNCTION 8192 | CONTACTS | iOS6 | DEPRECATED | NO | YES | YES |

| DYNAMIC APPLICATION VULNERABILITY SCAN REPORT (DATED DD/MM/YYYY) | | | |
|---|---|---|---|
| APP ID | APP NAME | FUNCTION ID | VULNERABILITY INDEX CALCULATED |
| com.ibm.sales.App1 | App1 | 2048 | 50 |
| com.ibm.chq.App2 | App2 | 4095 | 95 |
| com.ibm.finance.App3 | App3 | 1024 | 75 |
| com.ibm.research.App4 | App4 | 8192 | 10 |

STATIC THRESHOLD TABLE (ADMIN CONFIGURABLE)

| THRESHOLD TYPE | LEVEL |
|---|---|
| BLOCK_DATA_ACCESS | 75 |
| UN_INSTALL_APP | 85 |
| WIPE_DEVICE | 95 |

DETERMINING AND MANAGING APPLICATION VULNERABILITIES

BACKGROUND

Embodiments of the present invention relate in general to determining and managing application vulnerabilities. More specifically, embodiments of the present invention relate to a bring-your-own-device enterprise system that determines and manages vulnerabilities in applications.

Bring your own device (BYOD) generally refers to corporate policies that allow employees to use their own employee-owned devices to access corporate information and to use corporate applications. Employees can use their own computers, phones, tablets, and/or other mobile devices to fulfill their workplace responsibilities. With the adoption of BYOD, corporations face certain risks such as data breaches, malware threats, and accidental disclosure of sensitive data, for example.

SUMMARY

According to one or more embodiments of the present invention, a computer-implemented method can include retrieving application files of an enterprise application store. Each application file corresponds to an application provided by the enterprise application store. The method includes scanning each retrieved application file. The scanning includes identifying vulnerable application program interfaces that are used by each retrieved application file. The method can also include assigning a vulnerability index to each application, based on the scanning of each application's corresponding application file.

According to one or more embodiments of the present invention, a computer system includes a memory. The computer system also includes a processor system communicatively coupled to the memory. The processor system is configured to perform a method including retrieving application files of an enterprise application store. Each application file corresponds to an application provided by the enterprise application store. The method also includes scanning each retrieved application file. The scanning includes identifying vulnerable application program interfaces that are used by each retrieved application file. The method also includes assigning a vulnerability index to each application, based on the scanning of each application's corresponding application file.

According to one or more embodiments of the present invention, a computer program product for determining and managing application vulnerabilities is provided. The computer program product includes a computer-readable storage medium that has program instructions embodied therewith. The program instructions are readable by a processor system to cause the processor system to perform a method. The method includes retrieving application files of an enterprise application store. Each application file corresponds to an application provided by the enterprise application store. The method also includes scanning each retrieved application file. The scanning includes identifying vulnerable application program interfaces that are used by each retrieved application file. The method also includes assigning a vulnerability index to each application, based on the scanning of each application's corresponding application file.

BRIEF DESCRIPTION OF THE DRAWINGS

The subject matter of the present invention is particularly pointed out and distinctly defined in the claims at the conclusion of the specification. The foregoing and other features and advantages are apparent from the following detailed description taken in conjunction with the accompanying drawings in which:

FIG. 4 depicts an interface that displays a dynamic API matrix, in accordance with one or more embodiments of the present invention;

FIG. 5 depicts an interface that displays a dynamic application vulnerability scan report, in accordance with one or more embodiments of the present invention;

FIG. 6 depicts an interface that displays a static threshold table, in accordance with one or more embodiments of the present invention;

DETAILED DESCRIPTION

Figure 1A:
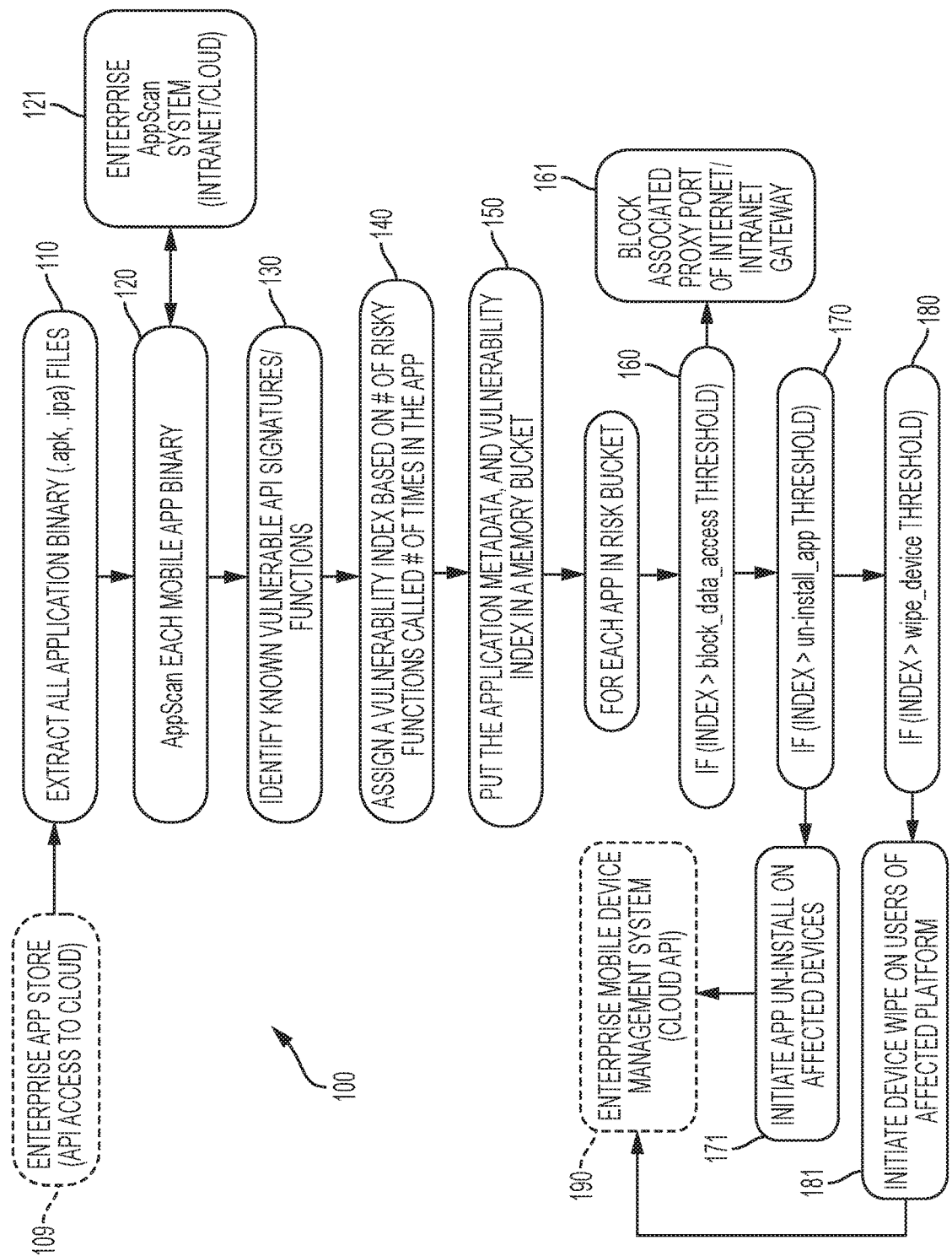
FIG. 1A depicts a flowchart of a method in accordance with one or more embodiments of the present invention.

Various embodiments of the present invention are described herein with reference to the related drawings. Alternative embodiments can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

It is also understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

As an increasing number of different electronic devices emerge on the market, corporate employees increasingly desire to use their own devices to complete their workplace responsibilities. Corporate employees also increasingly desire to bring their own devices into the corporate workplace.

As corporate employees are able to choose their own devices, these corporate employees will be able to use their desired platform of choice. Each device utilizes a specific platform, depending on the type of the device (such as the iOS platform for Apple devices, the Android platform for Google devices, and the Windows platform for Microsoft devices, for example). The large variety of possible platforms that are used by employees can cause difficulties for corporate employers, as described in more detail below.

Companies typically provide their employees with different applications to complete their workplace duties. These application can include, but are not limited to, communication applications, reporting applications, publishing applications, networking applications, document management applications, accounting applications, design applications, simulation applications, etc. These different applications can be distributed to the employees via a corporate repository or an enterprise application store, for example. An enterprise application store can generally refer to a portal where employees can retrieve and use applications that have been designated by a corporation. The enterprise application store can offer applications to employees at cost or at no cost.

When the employees access/download the different applications from the enterprise application store, the employees access/use the different applications on a variety of different employee devices. As an application is run on a platform of a device, the application uses a set of application programming interfaces (APIs) that are specific to the platform upon which the application is run on. The particular set of APIs that is used will depend on the specific platform that the application is operating upon, and will depend on the specific functions/features that are provided by the application.

Because employees can use a diverse set of devices (where each device uses a particular platform), and because each platform is associated with its own diverse set of APIs, corporations have difficulty determining which applications use which platform APIs. As such, if a particular API is identified to have a particular vulnerability, companies also have difficulty ascertaining the impact of the identified vulnerability. For example, companies have difficulty determining which applications are affected by an identified vulnerability, and companies have difficulty determining how many employees and devices are affected by the identified vulnerability.

In view of the above, one or more embodiments of the invention provide methods, systems and computer program products for determining and managing application vulnerabilities. More specifically, embodiments of the present invention are directed to a method of determining a vulnerability index for each application, based on the APIs and/or functions used by each application. Corporations can use the vulnerability index to determine whether a particular application is affected by identified vulnerabilities. Embodiments of the present invention can determine the vulnerability index for each application by individually scanning a file (or files) for each application. The method of determining the vulnerability index can also be an automated process that is performed regularly, or that is triggered under specific circumstances, for example.

Further, upon determining vulnerability indexes for different applications, embodiments of the present invention can uninstall applications from specific devices, based on the determined vulnerability indexes, as described in more detail below. Based on the determined vulnerability indexes, embodiments of the present invention can also block an application from accessing corporate data (such as information on the intranet, for example), as described in more detail below. For example, if an application is determined to use APIs that have serious vulnerabilities, then the determined vulnerability index of the application will reflect such vulnerabilities. Thus, with a determined vulnerability index that indicates the presence of vulnerabilities, embodiments of the present invention can uninstall this particular application. Embodiments of the present invention can also selectively erase applications or portions of memory from particular devices, based on the determined vulnerability indexes.

Information technology (IT) enterprises can use embodiments of the present invention to dynamically identify applications which are suddenly vulnerable due to an API vulnerability that is recently identified. Embodiments of the present invention can automatically determine the number of applications that are affected by API vulnerabilities. Embodiments of the present invention can determine the number of devices that are affected by identified API vulnerabilities, and embodiments of the present invention can determine the number of users that are affected by the identified API vulnerabilities.

Embodiments of the present invention can also initiate an automated or controlled response to block and/or to uninstall highly vulnerable applications, as initiated based on the vulnerability indexes. Previous approaches to managing enterprise applications do not dynamically detect which vulnerable APIs are being used by which users. Previous approaches also do not dynamically determine the number of applications that are using the vulnerable APIs. Previous approaches also do not determine how many employee/corporate devices use the vulnerable APIs. Finally, previous approaches also do not dynamically perform automated blocking or uninstalling of applications from threatened/vulnerable devices, in order to control the potential threat in real-time.

FIG. 1(a) depicts a flowchart of a method 100 in accordance with one or more embodiments of the present invention. Referring to the flowchart of FIG. 1, the method 100, at 110, extracts a list of applications of an enterprise application store 109. The enterprise application store 109 can be cloud-based (as indicated by the dotted lines), for example. From this list, the method 100 also extracts the files of the applications of the enterprise application store. For example, the method 100 can extract .apk files and/or .ipa files (or files of any other packaged file format), depending on the application. The method 100, at 120, can perform an application scan (AppScan) that scans the content of each file. The method can perform the application scan via an AppScan sub-system 121, for example. The AppScan sub-system 121 can be self-contained or intranet-hosted, or it can be a cloud-based service. The AppScan can scan the binary data of each file. Embodiments of the present invention can initiate an application scan on .apk files for android devices and/or .ipa files for iOS, for example. Embodiments of the present invention can also perform scanning of other packaged file formats like .jar, .jad, .cod, .xap, .appx, for example, for other platforms like Blackberry, Windows Mobile, etc.

The method 100, at 130, can identify any use of vulnerable APIs and/or vulnerable functions. The method 100, at 140, can assign a vulnerability index to each of the applications of the enterprise application store, based upon the scanning of each application's file. The vulnerability index can be calculated based on the number of vulnerable APIs/functions used by an application, and based on the number of times each vulnerable API/function is used. The method 100, at 150, can store the application metadata and the determined vulnerability index in memory (such as, for example, in a memory bucket). Finally, in steps 160-180, embodiments of the present invention can compare the determined vulnerability index of each application against different thresholds. For example, if the determined index is greater than a predetermined "block_data_access_threshold" at comparison 160, then embodiments of the present invention can, at 161, initiate blocking the application from accessing proxy ports and/or internet/intranet gateways. As described above, based on comparison 170, embodiments of the present invention can also, at 171, initiate uninstalling of applications. Based on comparison 180, embodiments of the present invention can also, at 181, wipe away different portions of user memory. Upon initiating uninstalling of applications and/or wiping away of memory, embodiments of the present invention can request that an enterprise mobile device management system 190 assist in the uninstalling and/or wiping away of memory, for example. The enterprise mobile device management system 190 can be cloud-based (as indicated by the dotted lines). In view of the above, embodiments of the present invention determine if each application uses a given API which has been reported to be vulnerable. Further, embodiments of the present invention display a tabulated view of all applications that are scanned, and display the vulnerability index for each application.

Figures 1B, 2:
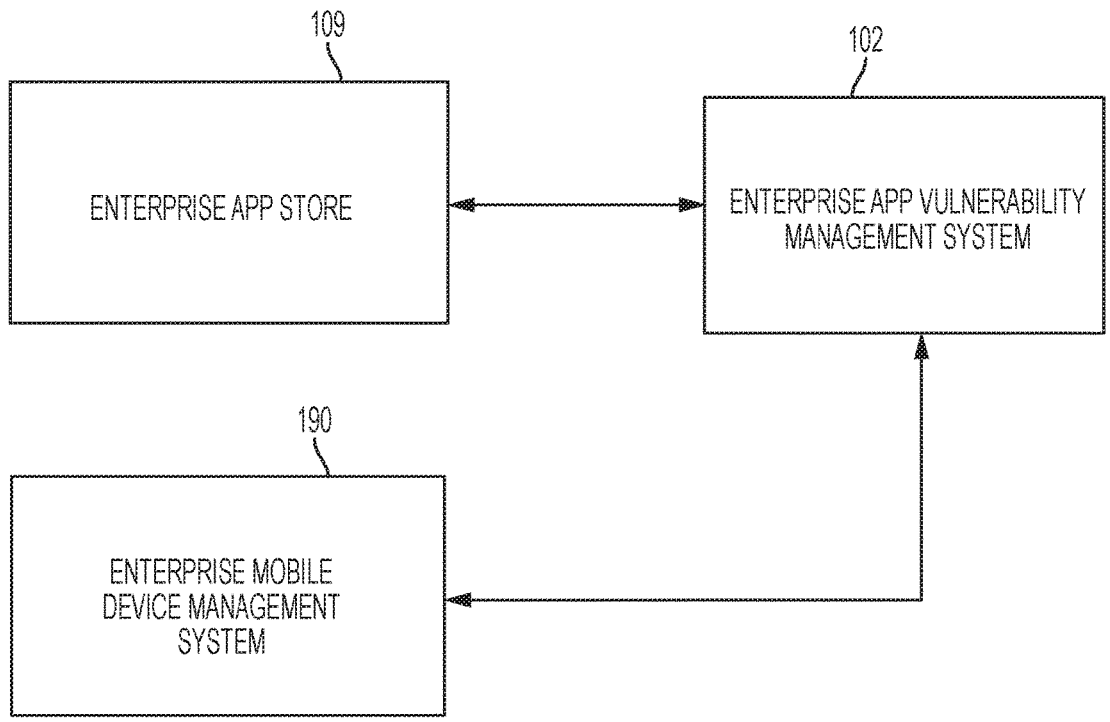
FIG. 1B depicts a system-level block diagram in accordance with one or more embodiments of the present invention.
FIG. 2 depicts an interface that displays different threat categories, in accordance with one or more embodiments of the present invention.

FIG. 1(b) depicts a system-level block diagram in accordance with one or more embodiments of the present invention. FIG. 1(b) depicts an enterprise application vulnerability management system 102 that can be configured to perform method 100 of FIG. 1(a). As described above, enterprise application vulnerability management system 102 can be configured to receive/extract a list of applications of an enterprise application store 109. Further, as described above, enterprise application vulnerability management system 102 can be configured to request that an enterprise mobile device management system 190 assist in the uninstalling and/or wiping away of memory, for example.

FIG. 2 depicts an interface that displays different threat categories, in accordance with one or more embodiments of the present invention. By accessing interface 200, a user (such as a corporate administrator, for example) can customize the threat weight for each threat category. Embodiments of the present invention can also allow users to add, remove, or edit threat categories. In the example of FIG. 2, privacy related APIs are considered to have a high threat weight of "4." Embodiments of the present invention allow a user/corporate administrator to define the severity of a potential threat from each threat category. With embodiments of the present invention, a higher threat weight can correspond to a potential threat of greater severity. Interface 200 also displays various categories of threats, which can correspond to deprecated (i.e., superseded) APIs, vulnerable APIs, social APIs, and/or privacy-related APIs, for example. Interface 200 allows users to dynamically change weights and threat categories, allowing the information within the enterprise system to remain up to date.

Figure 3:
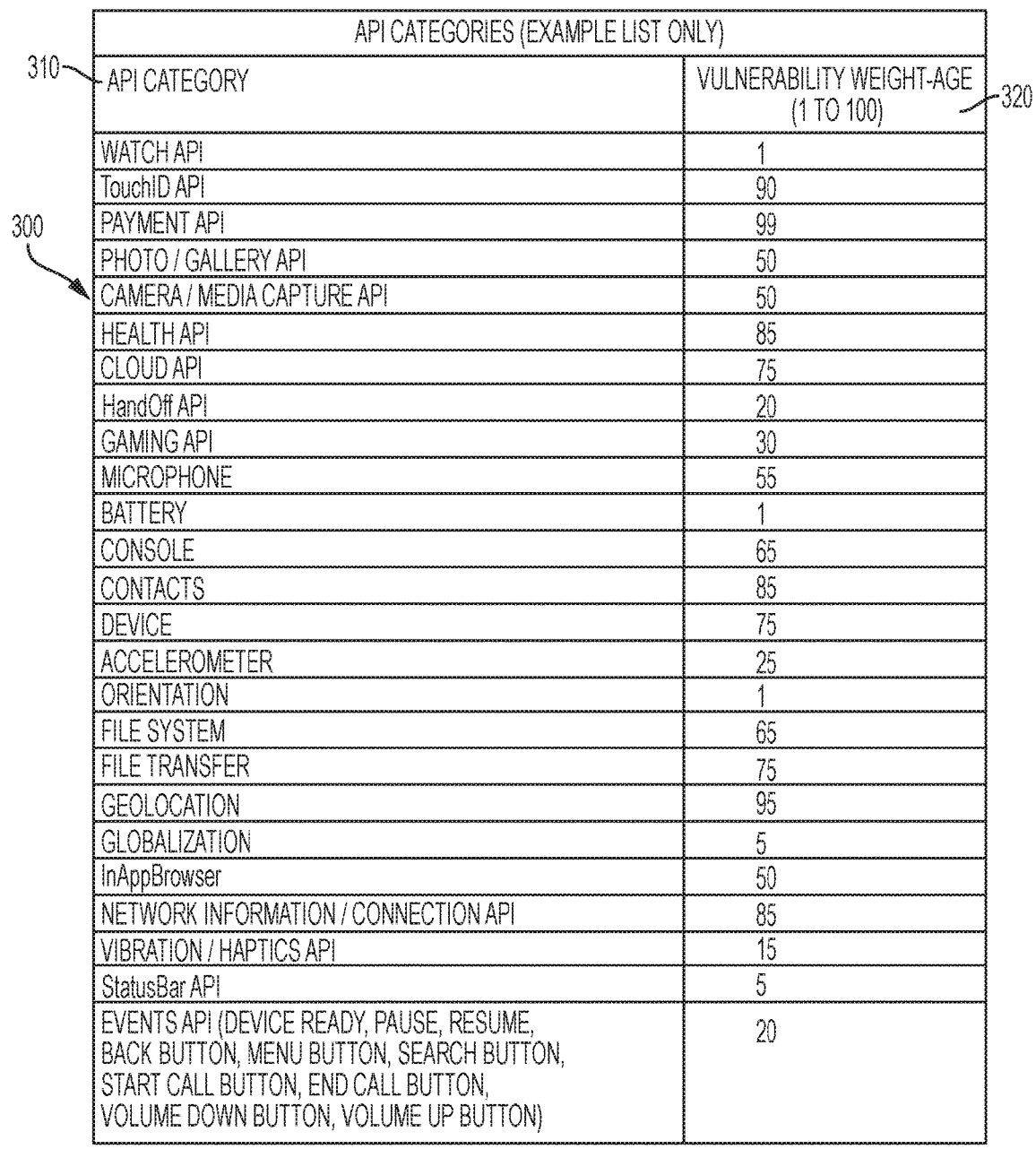
FIG. 3 depicts an interface that displays different application programming interface (API) categories, in accordance with one or more embodiments of the present invention.

FIG. 3 depicts an interface that displays different API categories, in accordance with one or more embodiments of the present invention. By accessing interface 300, a user (such as a corporate administrator, for example) can customize the vulnerability weight for each API category. API Category 310 can include a list of different types of APIs, and Vulnerability Weight-age 320 can include a weighting of the vulnerability of each type of API. In the example of FIG. 3, payment APIs are considered to have a vulnerability weight of "99." Interface 300 can allow users to dynamically add, remove, or edit API categories, as well as add, remove, or edit vulnerability weights. Interface 300 allows users to dynamically change weightings and API categories, allowing the information within the enterprise system to remain up to date.

FIG. 4 depicts an interface that displays a dynamic API matrix, in accordance with one or more embodiments of the present invention. Embodiments of the present invention display an interface 400 with a dynamic API Matrix that includes a list of all API functions, for all operating systems/platforms, that are to be scanned. Vulnerable functions can be publicly listed as being vulnerable (from Anti-virus companies or from crowd-sourced information) or can be identified as being vulnerable functions by the Enterprise/corporation. Embodiments of the present invention can also provide a matrix that provides for an Enterprise level Exception to disregard specific known vulnerabilities during a scan and wipe surgical cycle. Embodiments of the present invention can allow users to dynamically edit any entries of "Function ID," "Function Name," "API Category," "Platform ID," "Threat Category," "Publicly listed Vulnerability," "Enterprise listed Vulnerability," and/or "Enterprise Exception Override," for example. Alternatively, the information of interface 400 can be automatically populated using the information derived from interfaces 200 and 300. Embodiments of the present invention can enable Interface 400 allows users to dynamically add, remove, or edit the list of API functions, allowing the information within the enterprise system to remain up to date.

FIG. 5 depicts an interface that displays a dynamic application vulnerability scan report, in accordance with one or more embodiments of the present invention. The dynamic application vulnerability scan report 500 displays a list of applications that have been scanned. Each of the applications listed on the scan report 500 have had an application file scanned in the manner described above. The listed applications are listed by application identifier (App ID) 510 and application name (App Name) 520. The scan report 500 also shows API functions used by each of the listed applications. For example, referring to scan report 500, an application "com.ibm.sales.App1," referred to as "App1," uses an API function 2048 that has been found to be vulnerable during a scan. Scan report 500 also indicates that this application has a vulnerability index of "50." If a new vulnerability is discovered, the newly vulnerable API can be listed in the dynamic API matrix of interface 400, and then the vulnerability indexes of vulnerability scan report 500 will be dynamically updated, when the AppScan is re-run next time. As such, with embodiments of the present invention, a user can clearly ascertain the potential level of vulnerabilities for each application, at any given time, from the most recent/last scan report 500.

FIG. 6 depicts an interface that displays a static threshold table, in accordance with one or more embodiments of the present invention. Embodiments of the present invention allow a user/corporate administrator to dynamically modify different thresholds, which determine a type of precautionary action to be taken. Specifically, referring to static threshold table 600, a "BLOCK_DATA_ACCESS" threshold is 75. Therefore, if an application's vulnerability index meets or exceeds the "BLOCK_DATA_ACCESS" threshold of 75, then embodiments of the present invention initiate blocking of the application from accessing data. Further, an "UN_INSTALL_APP" threshold is 85. Therefore, if an application's vulnerability index meets or exceeds the "UN_INSTALL_APP" threshold of 85, then embodiments of the present invention initiate uninstalling of the application. Therefore, embodiments of the present invention refer to the thresholds in static threshold table 600, when determining whether to initiate precautionary actions. Static threshold table 600 also allows corporate/administrative users to dynamically add, remove or configure threshold types and their levels, thereby allowing the information within the enterprise system to remain up-to-date.

Figure 7:
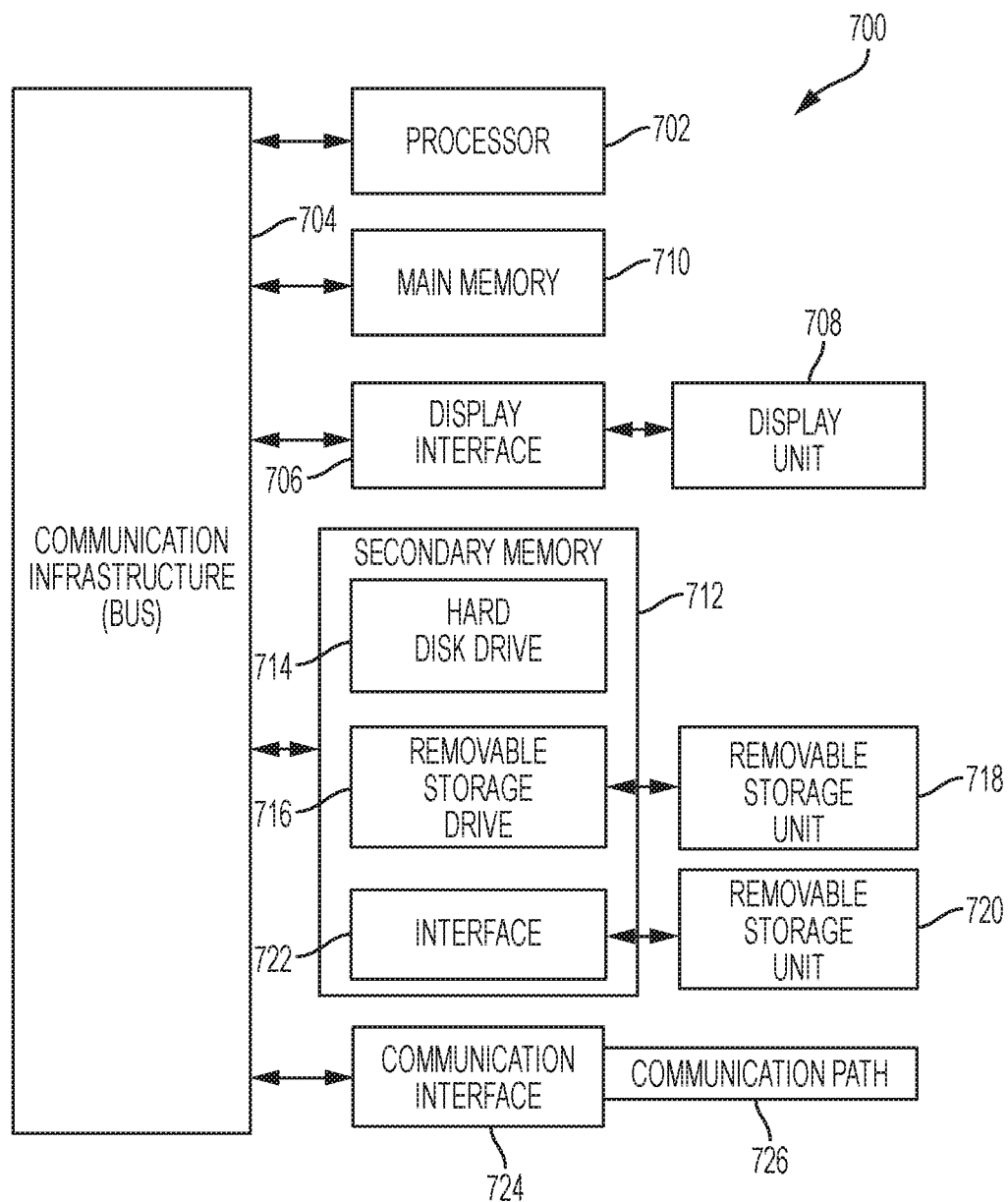
FIG. 7 depicts a high-level block diagram of a computer system, which can be used to implement one or more embodiments of the present invention.

FIG. 7 depicts a high-level block diagram of a computer system 700, which can be used to implement one or more embodiments. More specifically, computer system 700 can be used to implement hardware components of systems capable of performing methods described herein. For example, computer system 700 can be used to implement the hardware components of enterprise application vulnerability management system 102 (of FIG. 1(b)). Although one exemplary computer system 700 is shown, computer system 700 includes a communication path 726, which connects computer system 700 to additional systems (not depicted) and can include one or more wide area networks (WANs) and/or local area networks (LANs) such as the Internet, intranet(s), and/or wireless communication network(s). Computer system 700 and additional system are in communication via communication path 726, e.g., to communicate data between them.

Computer system 700 includes one or more processors, such as processor 702. Processor 702 is connected to a communication infrastructure 704 (e.g., a communications bus, cross-over bar, or network). Computer system 700 can include a display interface 706 that forwards graphics, textual content, and other data from communication infrastructure 704 (or from a frame buffer not shown) for display on a display unit 708. Computer system 700 also includes a main memory 710, preferably random access memory (RAM), and can also include a secondary memory 712. Secondary memory 712 can include, for example, a hard disk drive 714 and/or a removable storage drive 716, representing, for example, a floppy disk drive, a magnetic tape drive, or an optical disc drive. Hard disk drive 714 can be in the form of a solid state drive (SSD), a traditional magnetic disk drive, or a hybrid of the two. There also can be more than one hard disk drive 714 contained within secondary memory 712. Removable storage drive 716 reads from and/or writes to a removable storage unit 718 in a manner well known to those having ordinary skill in the art. Removable storage unit 718 represents, for example, a floppy disk, a compact disc, a magnetic tape, or an optical disc, etc. which is read by and written to by removable storage drive 716. As will be appreciated, removable storage unit 718 includes a computer-readable medium having stored therein computer software and/or data.

In alternative embodiments, secondary memory 712 can include other similar means for allowing computer programs or other instructions to be loaded into the computer system. Such means can include, for example, a removable storage unit 720 and an interface 722. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 720 and interfaces 722 which allow software and data to be transferred from the removable storage unit 720 to computer system 700.

Computer system 700 can also include a communications interface 724. Communications interface 724 allows software and data to be transferred between the computer system and external devices. Examples of communications interface 724 can include a modem, a network interface (such as an Ethernet card), a communications port, or a PC card slot and card, a universal serial bus port (USB), and the like. Software and data transferred via communications interface 724 are in the form of signals that can be, for example, electronic, electromagnetic, optical, or other signals capable of being received by communications interface 724. These signals are provided to communications interface 724 via communication path (i.e., channel) 726. Communication path 726 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 710 and secondary memory 712, removable storage drive 716, and a hard disk installed in hard disk drive 714. Computer programs (also called computer control logic) are stored in main memory 710 and/or secondary memory 712. Computer programs also can be received via communications interface 724. Such computer programs, when run, enable the computer system to perform the features discussed herein. In particular, the computer programs, when run, enable processor 702 to perform the features of the computer system. Accordingly, such computer programs represent controllers of the computer system. Thus it can be seen from the forgoing detailed description that one or more embodiments provide technical benefits and advantages.

Figure 8:
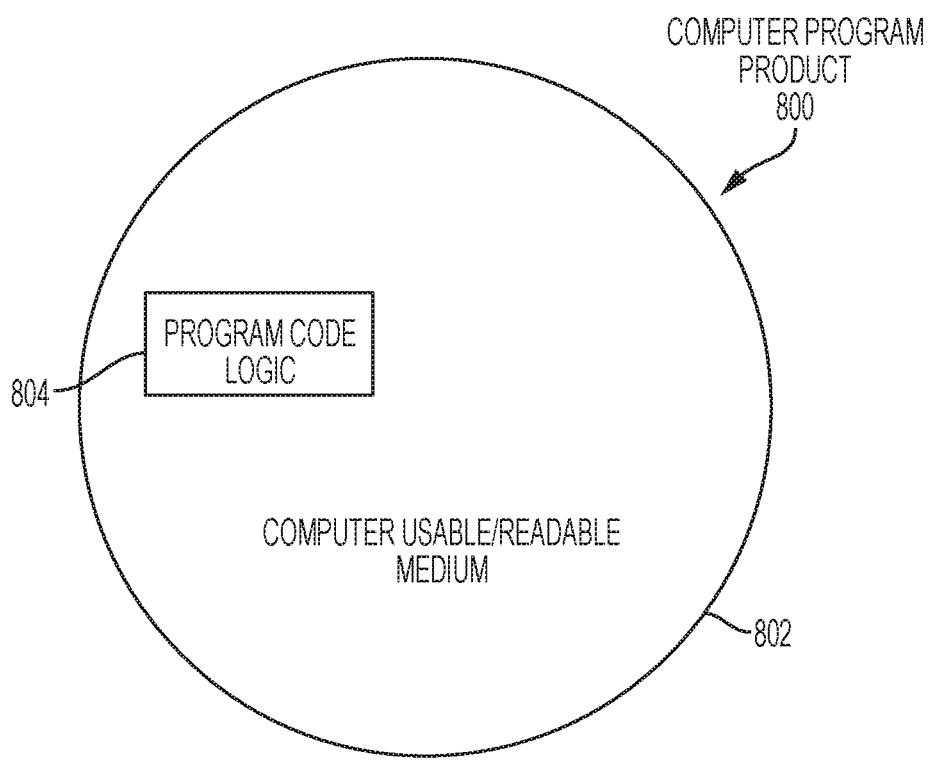
FIG. 8 depicts a computer program product in accordance with one or more embodiments of the present invention.

Referring now to FIG. 8, a computer program product 800 in accordance with an embodiment that includes a computer-readable storage medium 802 and program instructions 804 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
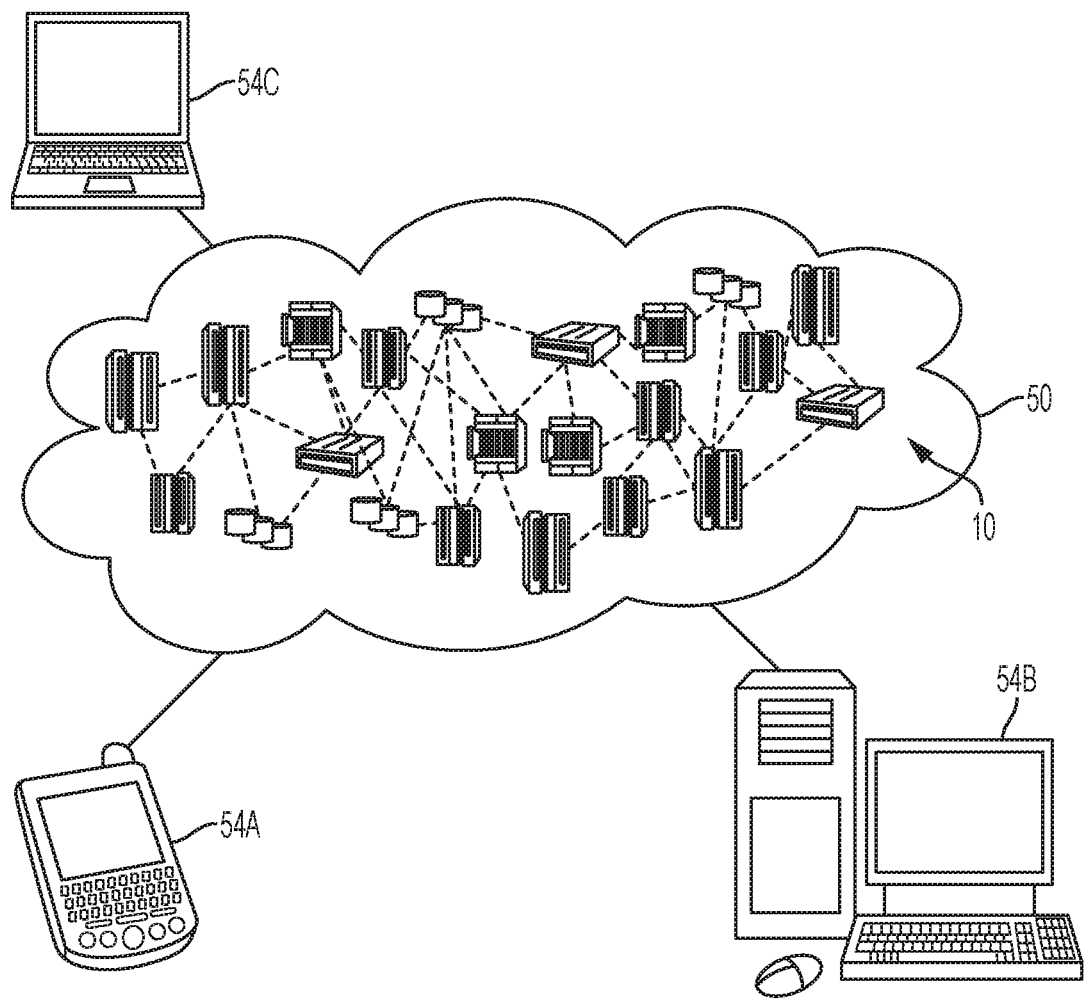
FIG. 9 depicts a cloud computing environment according to one or more embodiments of the present invention.

FIG. 9 depicts a cloud computing environment according to an embodiment of the present invention. Referring FIG. 9, illustrative cloud computing environment 50 is depicted. As described above, embodiments of the present invention can be implemented within a cloud computing environment. For example, an enterprise application store and/or an enterprise mobile device management system can be implemented within a cloud computing environment. Further, a system (such as enterprise application vulnerability management system 102) that performs the method of FIG. 1 can also be implemented within a cloud computing environment, for example. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-C shown in FIG. 9 are intended to be illustrative only and that computing nodes 10 and cloud computing environment 50 can communicate with any type of computerized device over any type of network and/or network addressable connection (e.g., using a web browser).

Figure 10:
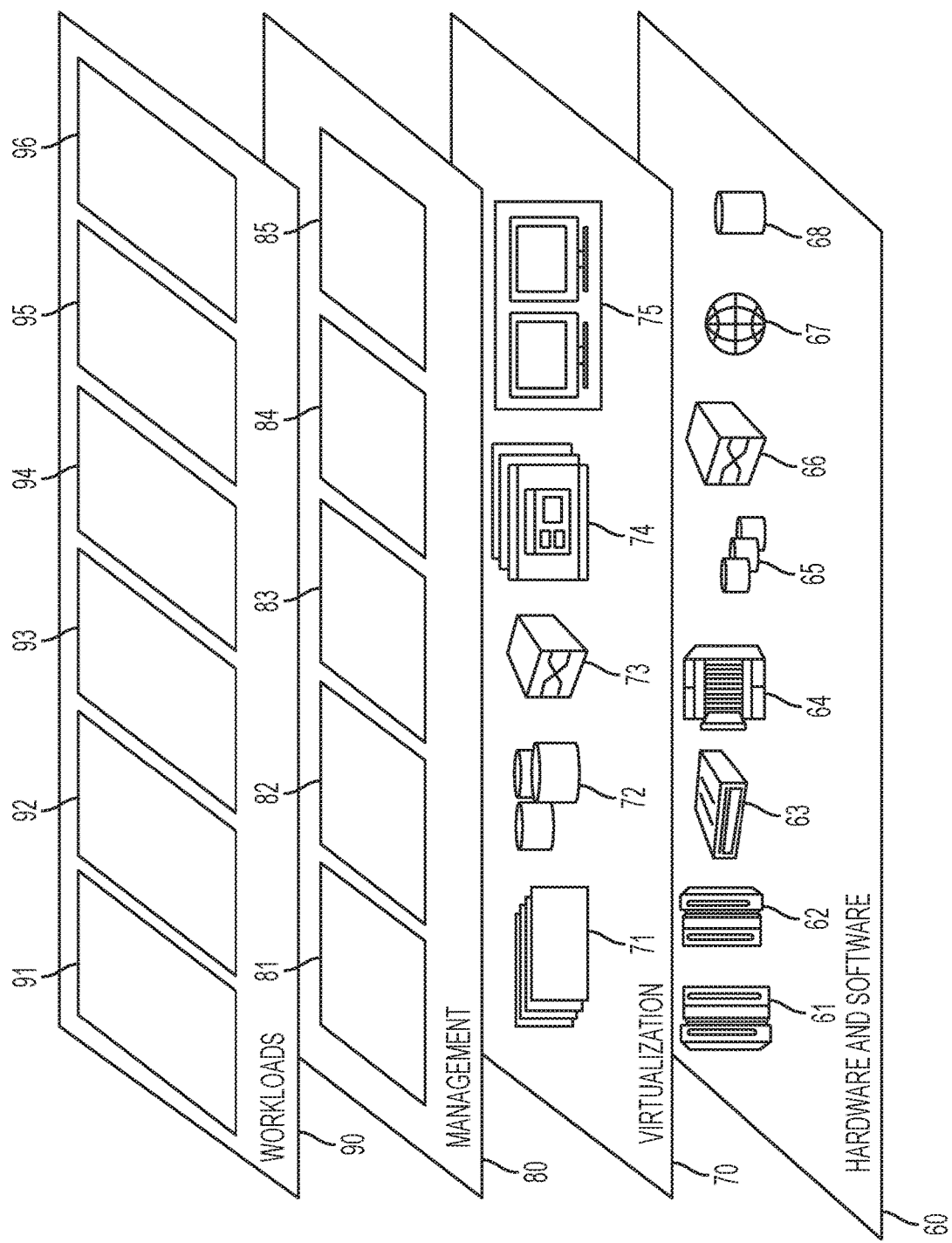
FIG. 10 depicts abstraction model layers according to one or more embodiments of the present invention.

FIG. 10 depicts abstraction model layers according to an embodiment of the present invention. Referring to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and managing/determining application vulnerabilities 96.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A computer implemented method comprising:
retrieving application files of an enterprise application store, wherein each application file corresponds to an application provided by the enterprise application store;
scanning each retrieved application file, wherein the scanning comprises identifying vulnerable application program interfaces that are used by each retrieved application file; and
assigning a vulnerability index to each application, based on the scanning of each application's corresponding application file, wherein assigning the vulnerability index comprises calculating the vulnerability index based on the number of vulnerable application program interfaces that are used and a number of times that each vulnerable application program interface is used,
wherein calculating the vulnerability index is further based on a threat weight of a threat category to which each vulnerable application program interface belongs.

2. The computer implemented method of claim 1 wherein calculating the vulnerability index is further based on a vulnerability weight-age of an application-program-interface category to which each vulnerable application program interface belongs.

3. The computer implemented method of claim 1 further comprising initiating at least one of blocking an application from accessing data, uninstalling an application, and wiping a device that uses an application, based upon the vulnerability index assigned to the application.

4. The computer implemented method of claim 1, wherein identifying vulnerable application program interfaces that are used comprises identifying use of application programming interfaces that are listed on a dynamic application program interface matrix, and the application program interface matrix is dynamically modified.

5. The computer implemented method of claim 4, wherein the dynamic application program interface matrix comprises application program interface categories, and the application program interface categories are dynamically modified.

6. The computer implemented method of claim 4, wherein the dynamic application program interface matrix comprises threat categories, and the threat categories are dynamically modified.

7. A computer system comprising:
a memory; and
a processor system communicatively coupled to the memory;
the processor system configured to perform a method comprising:
retrieving application files of an enterprise application store, wherein each application file corresponds to an application provided by the enterprise application store;
scanning each retrieved application file, wherein the scanning comprises identifying vulnerable application program interfaces that are used by each retrieved application file; and
assigning a vulnerability index to each application, based on the scanning of each application's corresponding application file, wherein assigning the vulnerability index comprises calculating the vulnerability index based on the number of vulnerable application program interfaces that are used and a number of times that each vulnerable application program interface is used;
wherein calculating the vulnerability index is further based on a threat weight of a threat category to which each vulnerable application program interface belongs.

8. The computer system of claim 7, wherein calculating the vulnerability index is further based on a vulnerability weight age of an application-program-interface category to which each vulnerable application program interface belongs.

9. The computer system of claim 7, wherein the processor system is further configured to perform initiating at least one of blocking an application from accessing data, uninstalling an application, and wiping a device that uses an application, based upon the vulnerability index assigned to the application.

10. The computer system of claim 7, wherein the identifying vulnerable application program interfaces that are used comprises identifying use of application programming interfaces that are listed on a dynamic application program interface matrix, and the application program interface matrix is dynamically modified.

11. The computer system of claim 10, wherein the dynamic application program interface matrix comprises application program interface categories, and the application program interface categories are dynamically modified.

12. The computer system of claim 10, wherein the dynamic application program interface matrix comprises threat categories, and the threat categories are dynamically modified.

13. A computer program product for determining and managing application vulnerabilities, the computer program product comprising a computer readable storage medium having program instructions embodied therewith, the program instructions readable by a processor system to cause the processor system to:

retrieve, by the processor system, application files of an enterprise application store, wherein each application file corresponds to an application provided by the enterprise application store;

scan, by the processor system, each retrieved application file, wherein the scanning comprises identifying vulnerable application program interfaces that are used by each retrieved application file; and assign a vulnerability index to each application, based on the scanning of each application's corresponding application file, wherein assigning the vulnerability index comprises calculating the vulnerability index based on the number of vulnerable application program interfaces that are used and a number of times that each vulnerable application program interface is used;

wherein calculating the vulnerability index is further based on a threat weight of a threat category to which each vulnerable application program interface belongs.

14. The computer program product of claim 13, wherein calculating the vulnerability index is further based on a vulnerability weight-age of an application-program-interface category to which each vulnerable application program interface belongs.

15. The computer program product of claim 13, wherein the processor system is further caused to perform initiating at least one of blocking an application from accessing data, uninstalling an application, and wiping a device that uses an application, based upon the vulnerability index assigned to the application.

16. The computer program product of claim 13, wherein the identifying vulnerable application program interfaces that are used comprises identifying use of application programming interfaces that are listed on a dynamic application program interface matrix, and the application program interface matrix is dynamically modified.

17. The computer program product of claim 16, wherein the dynamic application program interface matrix comprises application program interface categories, and the application program interface categories are dynamically modified.

* * * * *